May 22, 1956  W. E. KAUTENBERG  2,746,235
FLEXIBLE LAWN RAKES
Filed Jan. 2, 1953
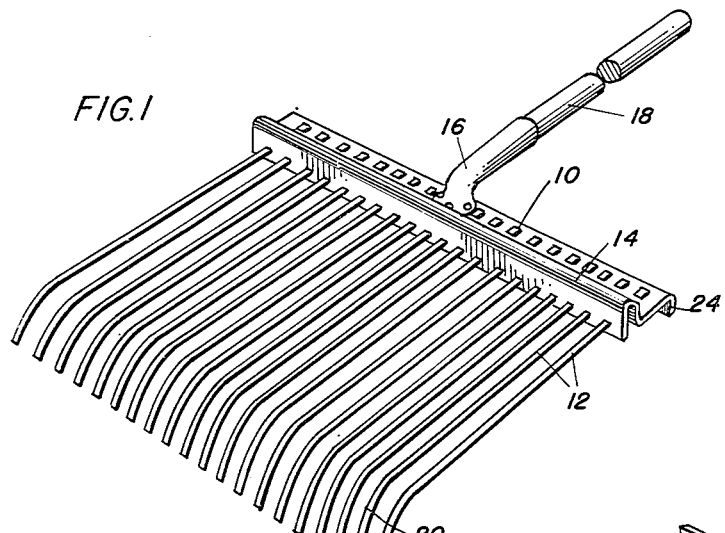
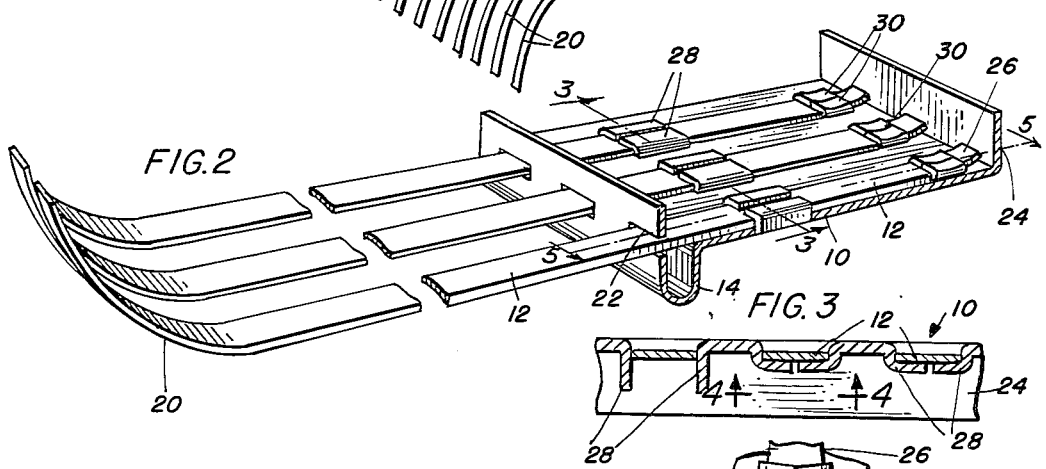
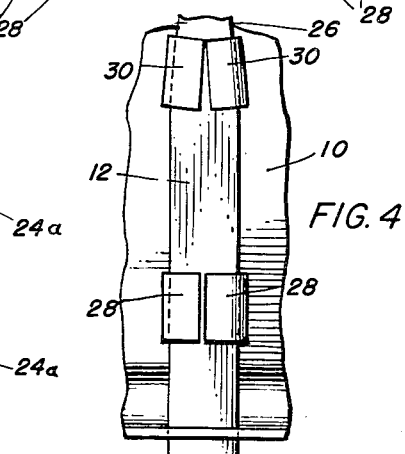
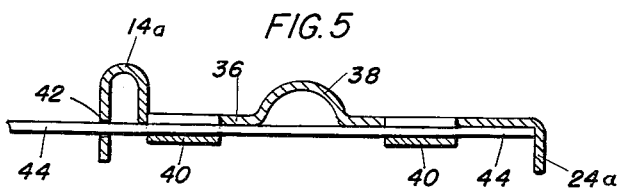
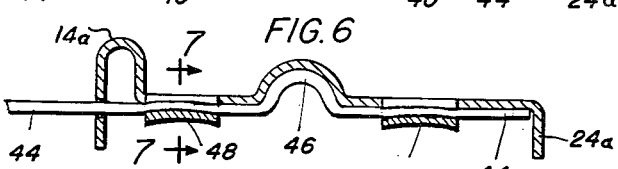
INVENTOR:
WILLIAM E. KAUTENBERG
BY Kent W. Wonnell
ATT'Y United States Patent Office 2,746,235
Patented May 22, 1956

2,746,235

FLEXIBLE LAWN RAKES

William E. Kautenberg, Freeport, Ill., assignor to W. E. Kautenberg Co., Freeport, Ill., a corporation of Illinois Application January 2, 1953, Serial No. 329,131

7 Claims. (Cl. 56—400.17)

This invention relates in general to flexible lawn rakes and is more particularly described as a rake having a metal cross head and metal tines of flat or round wire.

In making lawn rakes with flexible metal tines, it is important to firmly support one end of each tine, but to get the right flexibility, there should be no cross supports below the supporting cross head. By making the tines of special high carbon wire to insure proper strength and resiliency, the result is a rake which gathers leaves and other refuse in a positive but smooth way and without the slightest injury to the lawn.

Another advantage of metal tines is the ease with which they spread to straddle the stalks of bushes, flowers, and small posts or trees. This results in quicker and cleaner raking.

An important object of the invention is to provide a light strong and a resilient lawn rake with flexible tines which are securely fastened to the cross head at one end and are of flexible resilient material so that they will easily bend and flex when the rake is in use.

A further object of the invention is to provide new and improved means for permanently attaching the ends of the tines to the head of the rake.

A still further object of the invention is to provide a rake with a one piece sheet metal cross head having engaging portions pressed from the head for tightly attaching the ends of the tines thereto so that they will not move lengthwise and so that they have no tendency to twist or turn in the supporting head, thereby maintaining the other portions of the tines in a flexible and resilient condition.

A still further object of the invention is to provide a sheet metal rake construction in which the ends of the tines are securely held in a stamped sheet metal head which also provides a spaced support for the tines at the distance from the nearest point of connection in the head to prevent localization of the bending of the tine about the said point of connection in the head.

Other objects of the invention will appear in the specification and will be apparent from the accompanying drawings in which, Fig. 1 is a fragmentary perspective view of a rake with flat tines constructed in accordance with the principles of this invention;

Fig. 2 is an inverted enlarged perspective view of a portion of the head of the rake shown in Fig. 1 and several of the flat tines connected therein with parts broken away and shown in section;

Fig. 3 is a fragmentary transverse sectional view as taken through the tine engaging tongues on the line 3—3 of Fig. 2 in inverted position and showing one pair of tongues before it is bent.

Fig. 4 is a enlarged fragmentary plan view of one of the tines shown in Fig. 2 as taken on the line 4—4 of Fig. 3.

Fig. 5 is a sectional view of a modified form of rake head as taken on the line 5—5 of Fig. 2 with a round wire tine applied thereto before it is sealed in place;

Fig. 6 is a view similar to Fig. 5 with the tine permanently sealed in place; and Fig. 7 is a sectional view taken on the line 7—7 of Fig. 6.

In a rake with a sheet metal head, it is important to provide a construction which firmly binds the tines therein either when they are made of flat strips or of round wire construction.

The present invention not only clamps the tines in the head but also provides a strengthening bead along the front of the cross head which engages and supports the tines at a distance from the fastening in the cross head, thereby preventing a localization of the bending of the tine at the point of connection to the head.

Referring now more particularly to the drawings, a cross head 10 of sheet metal has a plurality of sheet metal tines 12 secured thereto and projecting through a raised strengthening bead 14 at the front of the head. Extending rearwardly from the head is a socket 16 to which a handle 18 is connected in any well known manner.

The tines 12 may be flat strips of high carbon steel to insure proper strength and resiliency and to maintain a proper permanent bend 20 at the outer end thereof. Each tine is inserted through a slotted opening 22 in which it does not fit tightly in the front side of the bead 14 which extends above and below the main portion of the head and at the rear edge of the head is a downwardly extending flange. The location of the slots 22 positions the end of a tine inserted through a slot in contact with the under side of the head and the rear end of the tine may abut the rear flange 24. The end of each tine 12 is formed with a slightly tapered extremity 26 which is adapted to be inserted more readily through the slot 22, and in the body of the head 10, two sets of tongues 28 and 30 are pressed out of the material and to the under side thereof to substantially embrace a tine inserted from the front therebetween. The tongues 28 are spaced apart substantially the width of the tine so that it is easily inserted therebetween because of the tapered end 26 and the tongues 30 are held closely together to receive the tapered end therebetween.

When the tines have been thus inserted into the head and between the tongues, the tongues are compressed against the under side of the tine and in the case of the tongues 30, the tongues are compressed more at the center than at the ends thereof to form an arc or bend to slightly upset the tapered end of the tine into the hole made by the tongues 30 as shown in Fig. 2, thereby slightly upsetting the extremity 26 of the tine but binding it tightly in place.

With this construction, it is apparent that each tine is firmly held in the body of the head 10 and the slotted opening 22 is spaced slightly more than the width of the bead 14 from the closest support in the head so that bending of the tine due to the raking action will not be localized in the opening 22 at the point of insertion into the head where it will tend to break after numerous bending actions, but it will have an outer loose support in the bead which will allow some flexibility because the tine does not fit tightly therein.

In securing a round tine to a cross head of this kind, it is preferable to use the construction shown in Figs. 5, 6 and 7. In this form, a metal cross head 36 having a front bead 14a and a rear flange 24a as shown in Figs. 1 and 2 is provided with an upward bend 38 and downward loops 40 formed of the material of the cross head and in the front of the bead 14a is an opening 42 into which each tine 44 is inserted, the loops 40 being in line with the opening 42 so that the tine is fed through them in pushing the wire tine through the cross head. After being so inserted, the wires are upset in a bend 46 so that they fit substantially in the upward bend 38 and at the same time, the loops 40 may be somewhat rounded or flattened at the lower edge 48 thereof which binds the tines tightly in place.

While these constructions have been described in some detail, they should be regarded as illustrations or examples rather than as limitations or restrictions of the invention, since various changes in the construction, combination and arrangement of the parts may be made without departing from the spirit and scope of the invention.

I claim:

1. A lawn rake with flexible tines, comprising a one-piece stamped sheet metal cross head having a front bead extending above and below and integral intermediate portion of the cross head with a rear downwardly extending flange, the front of the head having perforations in the bead to receive the tines loosely therein and the intermediate portion of the cross-head between the front bead and the rear flange having projections extending therefrom engaging the tines inserted in the head, the projections and the tines therein being offset together in a limited arc for holding the tines tightly in place.

2. In a flexible lawn rake with a one piece sheet metal cross head and separate flexible metal tines, the cross piece having a front bead extending above and below a substantially flat intermediate portion with a rear downwardly extending flange, the front of the bead having perforations with the tines inserted therethrough, and the intermediate portion of the cross head having projections extending therefrom for engaging over the side edges of the tines and offset with the tines for holding them tightly in place.

3. In a flexible lawn rake in accordance with claim 2, the plurality of tines being each inserted through the perforations in the front bead and between said projections at the side edges of the tines aligned with the perforations and at least one set of projections for each tine being offset in an arc to deflect the tine accordingly to hold it against lateral and longitudinal movement.

4. A flexible lawn rake in accordance with claim 2, in which the projection provided for each of the tines comprises tongues pressed out of the material of the cross head extending downwardly therefrom at the sides of the opening formed therefrom and at the sides of a tine, and the ends of the tongue bent over the under side of the tine, at least one of the pairs of tongues being offset in an arc longitudinally of the tine to partially upset the tine into the opening formed by the tongues.

5. In a flexible lawn rake construction in accordance with claim 2, the extremity of each tine being tapered so that it is inserted more readily through the perforation in the front bead and between the said projections, and the innermost pair of projections most remote from the front bead being curved in an arc lengthwise of the tine and the tapered portion of the tine being engaged and upset into the opening formed by the tongues and thereby partially upsetting the inserted extremity of the tine.

6. In a flexible lawn rake construction in accordance with claim 2, the tine fitting loosely in the front perforation of the bead of the cross head, and the projections forming the fastening means for engaging over the opposite side edges of the tine being located between the front and rear of the cross head to space the bending of the tine in the bead at a distance from the connection of the tine with the cross head.

7. In a flexible lawn rake construction in accordance with claim 2, the fastening projections which engage over the side edges of the tines being in the form of loops in line with the perforation in the front bead and through which the tine is inserted, and the tine and loops being offset and deflected in an arc lengthwise of the tine for holding the tine more firmly in position.

References Cited in the file of this patent

UNITED STATES PATENTS

| | | |
|---|---|---|
| 1,869,647 | Anderson | Aug. 2, 1932 |
| 1,970,616 | Montan | Aug. 21, 1934 |
| 2,156,480 | Owen | May 2, 1939 |
| 2,463,393 | Key | Mar. 1, 1949 |

FOREIGN PATENTS

| | | |
|---|---|---|
| 510,061 | Great Britain | July 26, 1939 |